United States Patent [19]

Schnepf

[11] Patent Number: 5,454,615
[45] Date of Patent: Oct. 3, 1995

[54] CONVERTIBLE TOP WITH A FLEXIBLE WINDOW PANE

[75] Inventor: Wolfgang Schnepf, Wiernsheim-Serres, Germany

[73] Assignee: Dr. Ing. h.c.F. Porsche AG, Weissach, Germany

[21] Appl. No.: 308,633

[22] Filed: Sep. 19, 1994

Related U.S. Application Data

[63] Continuation of Ser. No. 41,218, Mar. 31, 1993, abandoned.

[30] Foreign Application Priority Data

Mar. 31, 1992 [DE] Germany ............................ 42 10 475.0

[51] Int. Cl.⁶ .................................................... B60J 11/00
[52] U.S. Cl. ......................................... 296/95.1; 296/146.14
[58] Field of Search ........................... 296/146.14, 95.1, 296/136

[56] References Cited

U.S. PATENT DOCUMENTS

| | | | |
|---|---|---|---|
| 3,312,023 | 4/1967 | Zell | 296/95.1 X |
| 3,391,724 | 7/1968 | Charlesworth | 296/95.1 X |
| 4,025,103 | 5/1977 | Eichstaedt | |
| 4,768,823 | 9/1988 | Martinez | 296/95.1 |
| 4,799,727 | 1/1989 | Robbins et al. | 296/146.14 X |
| 4,811,982 | 3/1989 | Carlyle | 296/95.1 |

FOREIGN PATENT DOCUMENTS

| | | |
|---|---|---|
| 0261323 | 3/1988 | European Pat. Off. . |
| 2615567 | 10/1977 | Germany . |
| 3347551 | 2/1985 | Germany ......................... 296/146.14 |
| 3632148 | 3/1988 | Germany . |

Primary Examiner—Joseph Pape
Attorney, Agent, or Firm—Evenson, McKeown Edwards & Lenahan

[57] ABSTRACT

A convertible top with a flexible window pane made of plastic is provided with a protective cover so that the flexible window pane, which is susceptible to scratching will not be damaged when passing through an automatic car wash installation. The protective cover, which can be mounted and dismounted in a fast and simple manner, is provided on the exterior side of the flexible window pane.

17 Claims, 4 Drawing Sheets

CONVERTIBLE TOP WITH A FLEXIBLE WINDOW PANE

This application is a continuation of application Ser. No. 08/041,218, filed on Mar. 31, 1993, now abandoned.

BACKGROUND AND SUMMARY OF THE INVENTION

The present invention relates to a convertible top comprising a flexible window pane.

Several, partially contradictory demands are made on flexible window panes of motor vehicles. On the one hand, such window panes, which are made of plastic, must have good visual characteristics in order to ensure a clear and undistorted view. However, they must also be sufficiently stiff so that, when the top is closed, they assume a shape that, if possible, has no waves. On the other hand, the window panes must be sufficiently flexible so that they can go along in the folding operation of the top when the top is opened up, without suffering any buckling or permanent deformations.

The flexible window panes made of plastic (such as plasticized PVC) which are currently used in series-produced convertibles meet the requirements with respect to visual characteristics and elasticity. However, a disadvantage of these flexible window panes is that they are extremely susceptible to scratching. Thus, according to the operating instructions of vehicle manufacturers, convertibles with a flexible window pane must be not driven through automatic car wash installations because the brushes of the car wash installations will scratch the window panes. If the vehicle is nevertheless driven through an automatic car wash installation, a replacement or exchange of the flexible window pane will be necessary after several washing operations, which results in repair shop time and relatively high costs.

By contrast, the fabric covering of the top survives repeated drives through a car wash installation without any problems.

An object of the invention is to provide a convertible top that has a flexible window pane such that the vehicle can be driven through an automatic car wash installation without any scratching of the flexible window pane.

This and other objects are achieved by the present invention which provides a convertible top with a flexible window pane made of plastic having an exterior side, and a protective cover for covering the flexible window pane on the exterior side of the flexible window pane.

Some of the advantages achieved by the invention are that, by means of the mounting of a protective cover on the flexible window pane which had previously been cleaned manually, it becomes possible to drive through an automatic car wash installation for the cleaning of the whole vehicle without any scratching of the flexible window pane by the washing brushes. As a result, the high costs associated with the replacement of the flexible window pane are avoided. The removable protective cover which is placed onto the exterior side of the window pane can be manufactured in a simple and low-cost manner and can be rapidly mounted and dismounted on the vehicle.

Since certain embodiments of the invention have a multipart foldable construction, it requires little storage space in the vehicle. The quick-closing devices (snap fastener, Velcro fastener, or zipper) permit a mounting/dismounting of the protective cover which is simple and appropriate with respect to its function.

Other objects, advantages and novel features of the present invention will become apparent from the following detailed description of the invention when considered in conjunction with the accompanying drawings.

DETAILED DESCRIPTION OF THE DRAWINGS

Figure 1:
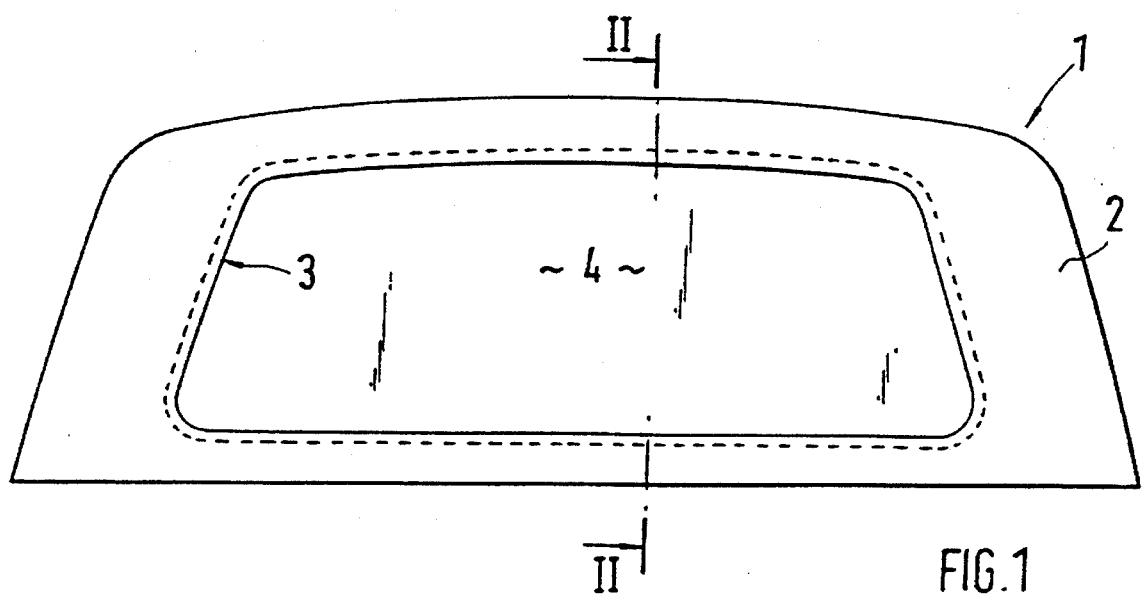
FIG. 1 is a rear view of a folding top, constructed in accordance with an embodiment of the present invention, with a rear window pane.
Figure 2:
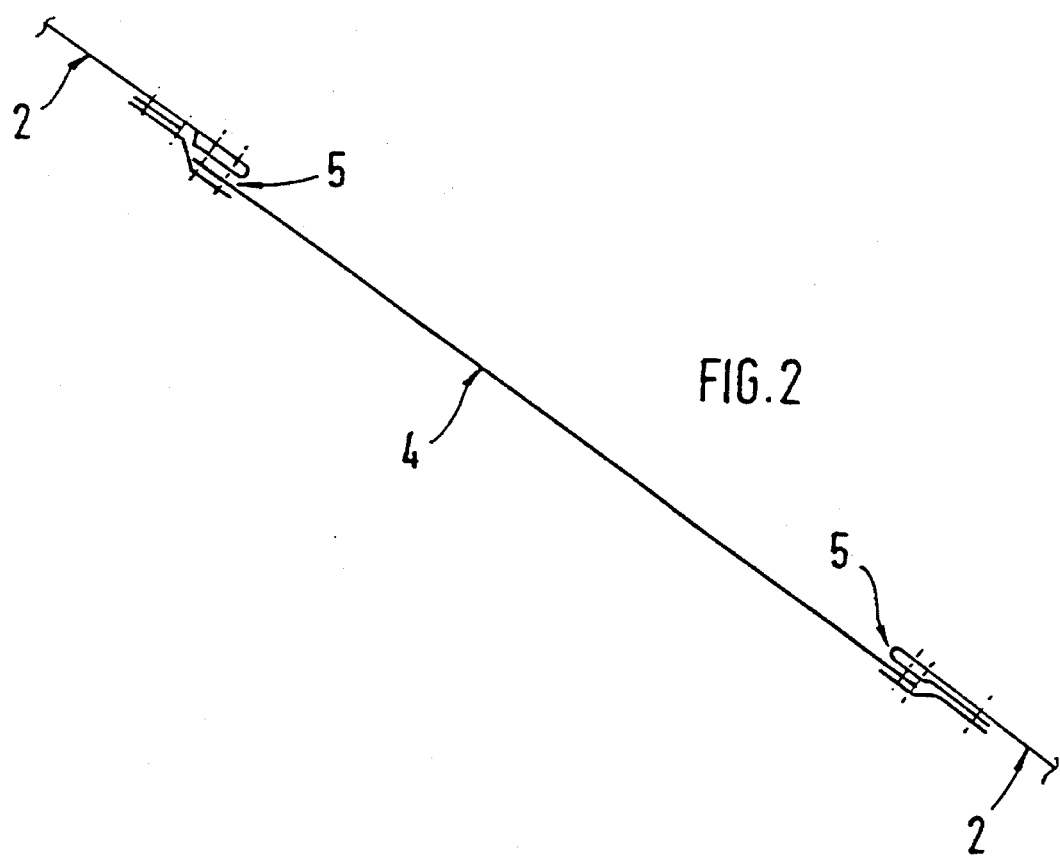
FIG. 2 is a sectional view along Line II—II of FIG. 1.

FIG. 1 illustrates a folding top 1 of a convertible, which is not shown in detail. The folding top 1 is in its completely unfolded condition (closing position) and is provided with a textile covering 2. On the rear side, this covering 2 has a trapezoidal recess 3 into which a window pane 4 is inserted which is made of a transparent flexible plastic material. The window pane 4 is connected with a U-shaped receiving section 5 of the covering 2 by being sewn along its edge.

The window pane 4 is made, for example, of plasticized PVC or a similar plastic material and forms the rear window of the convertible.

In order to be able to clean the convertible in an automatic car wash installation, the present invention provides that, after the flexible window pane 4 has previously been cleaned manually, a protective cover 6 can be fitted onto the exterior side of the convertible top (folding top). This cover 6 protects the flexible window pane 4 from scratches caused by the washing brushes of the car wash installation which are not shown.

The protective cover 6 is made of a lye-resistant plastic material, such as polypropylene, ABS, or the like and may be transparent or tinted.

Figure 4:
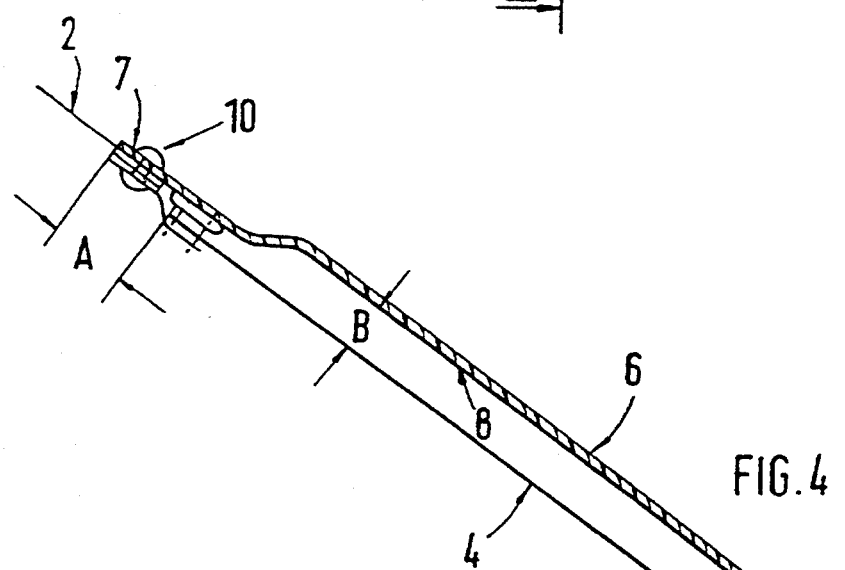
FIG. 4 is a sectional view along Line IV—IV of FIG. 3 with the fitted-on protective cover.
Figure 7:
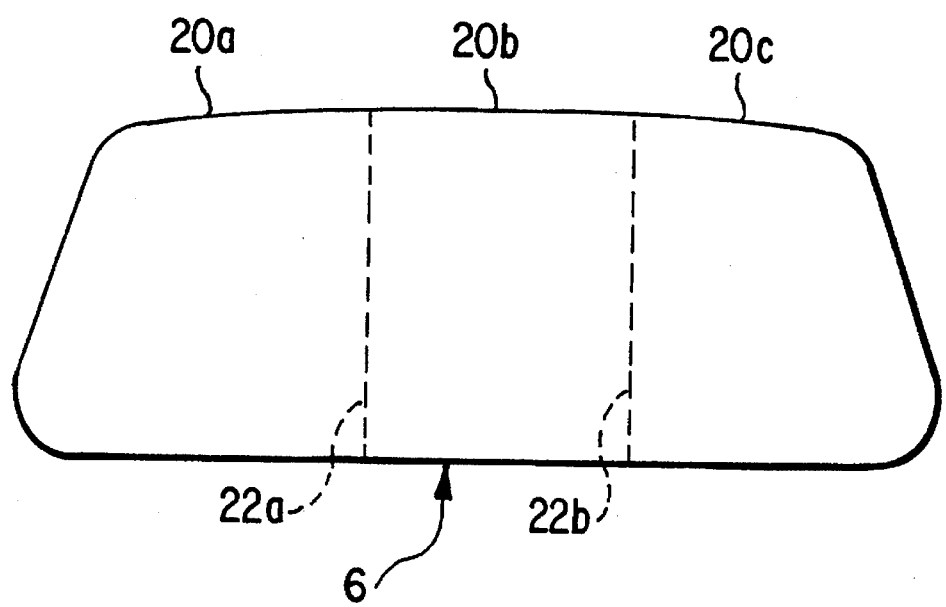
FIG. 7 shows another embodiment of a protective cover.

According to FIG. 4, a one-piece protective cover 6 is provided which protrudes beyond the flexible window pane 4 on all sides by an amount A. However, the protective cover 6 may also be constructed in several parts, in which case the individual sections can be folded together when the protective cover 6 is removed and therefore require little storage space in the vehicle. A schematic depiction of a foldable protective cover 6 is shown in FIG. 7. The cover 6 includes portions 20a, 20b, 20c which are foldable along lines 22a, 22b. The folding mechanism can be a conventional folding device, such as a hinge.

Figure 3:
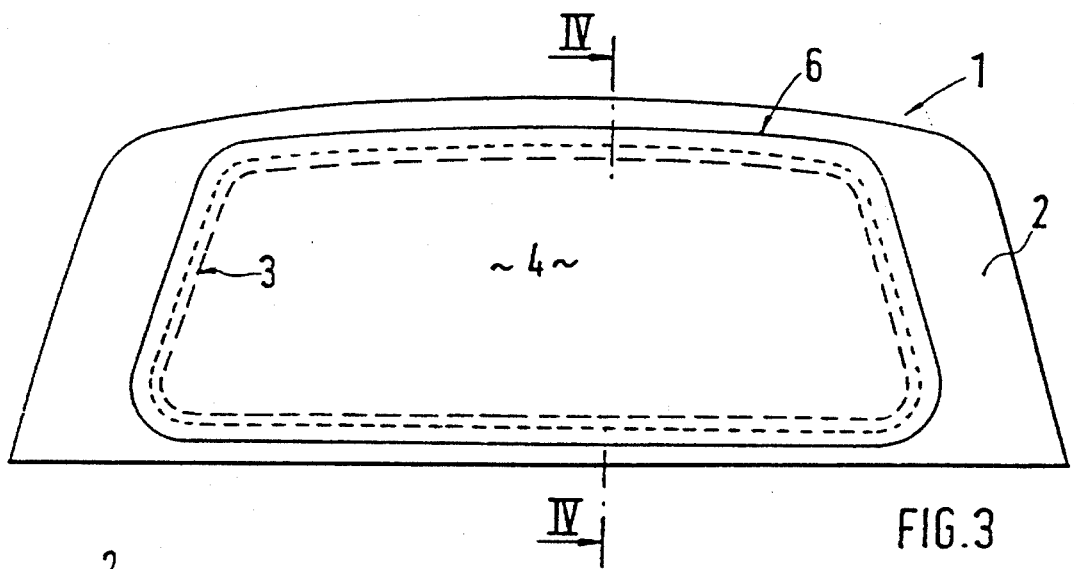
FIG. 3 is a view corresponding to FIG. 1 with a fitted-on protective cover.

The embodiment of the protective cover 6 which is illustrated in FIGS. 3 and 4 is formed by a dimensionally stable deep-drawn plastic part, the offset edge area 7 of which rests on the textile covering 2.

An interior section 8 of the protective cover 6 which is adjacent to the edge area 7 extends at a distance B with respect to the flexible window pane 4.

The protective cover 6 can be detachably connected with the folding top by at least locally arranged fast-closing devices 9. The fast-closing devices 9 may be formed by snap fasteners 10 (see FIG. 4) or by velcro fasteners or by a circumferential zipper, the two latter embodiments not being shown in detail.

In certain embodiments of the invention, locally outwardly projecting hooks 11 are mounted on the circumference of the protective cover 6 (FIG. 4). These hooks 11 can be inserted in corresponding receiving devices 12 of the convertible top.

Figure 5:
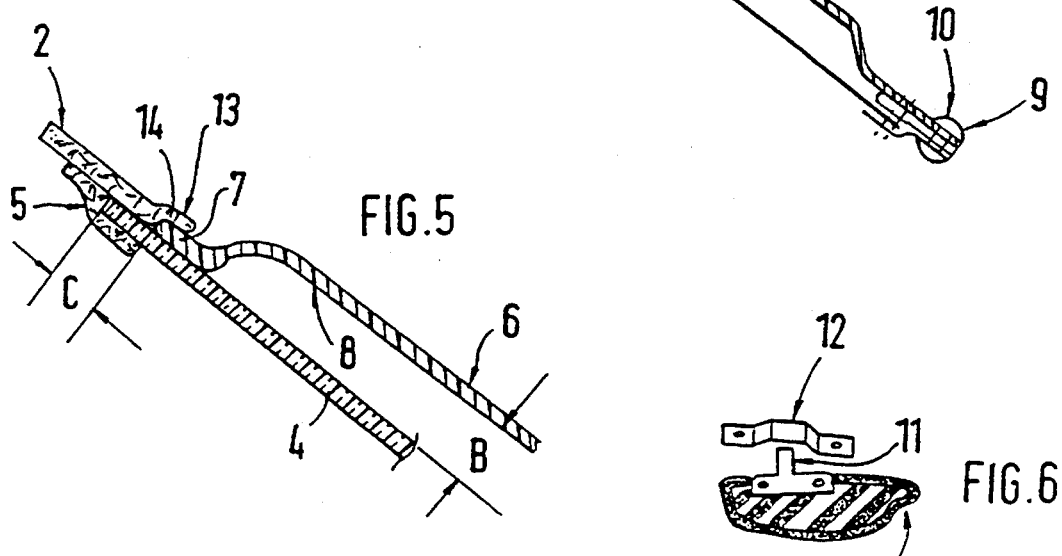
FIG. 5 is a sectional view of the edge area of the protective cover with another embodiment of a fastening device.
Figure 6:
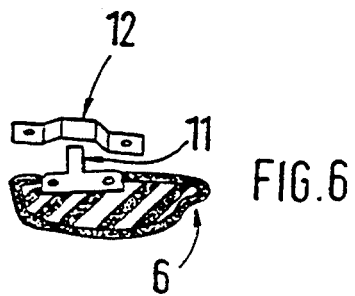
FIG. 6 is a perspective view of another embodiment of a fastening device for the protective cover.

FIG. 5 shows another embodiment of the present invention in which a clamping fastening 13 is used for the holding of the protective cover 6 on the convertible top. In this embodiment, the protective cover 6 is slightly smaller in top view than the flexible window pane 4, and the offset edge area 7 reaches under an exterior leg 14 of the receiving section 5 which projects over the flexible window pane 4.

In an embodiment of the present invention, the protective cover 6 is a roller blind which, when required, is pulled over the flexible window pane 4 (not shown in detail).

Figure 8:
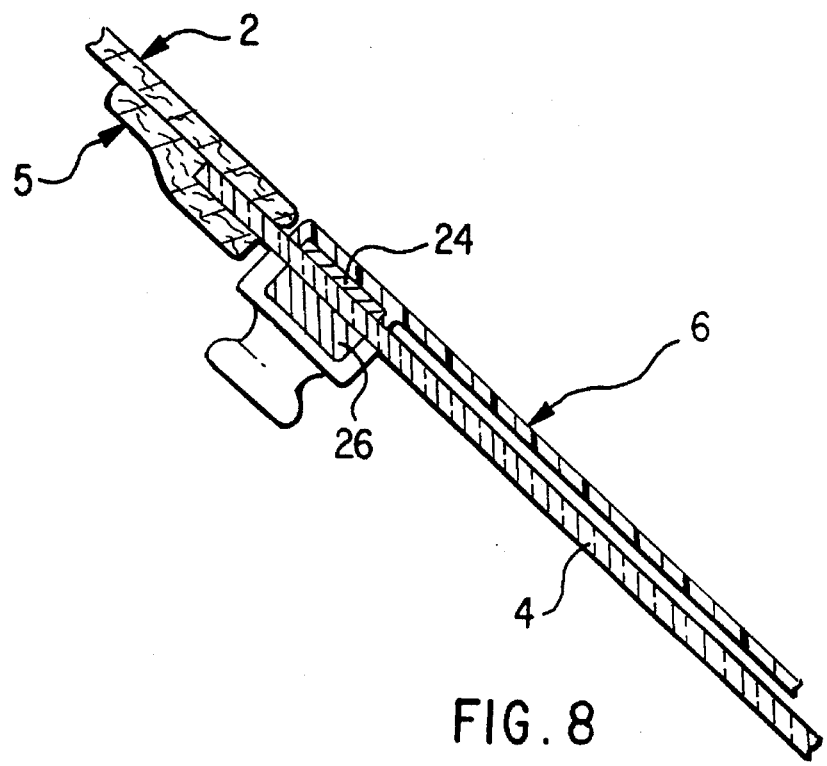
FIG. 8 shows another embodiment according to the present invention for fastening the protective cover.
Figure 9:
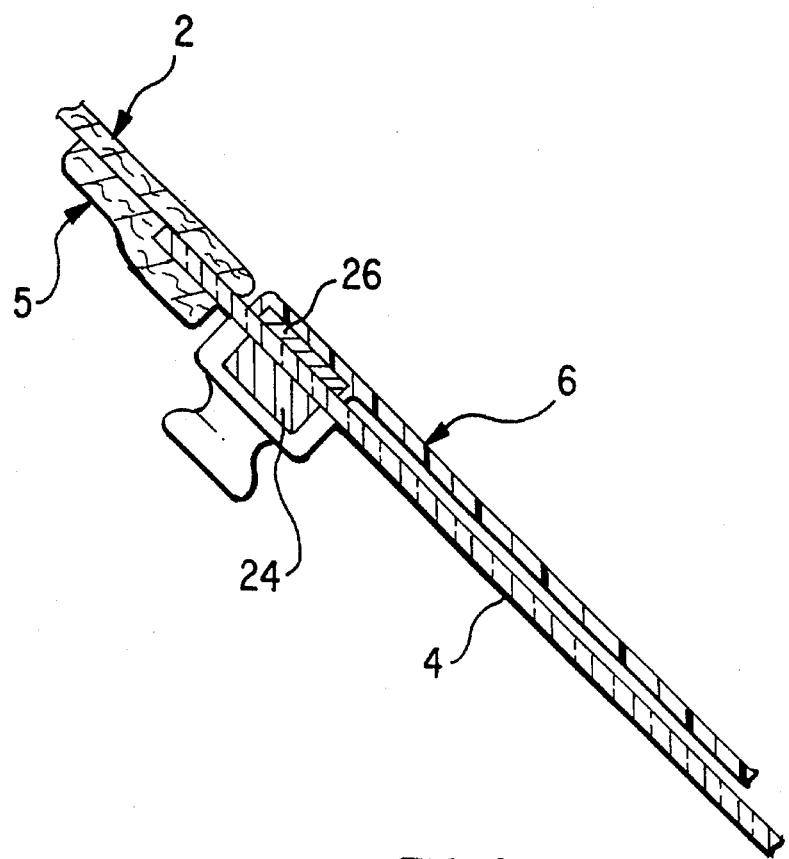
FIG. 9 shows another embodiment according to the invention for fastening the protective cover.

FIG. 8 illustrates another embodiment of a device for fastening the protective cover 6. In this embodiment, the fastening (or clamping) takes place through the window pane 4. In this embodiment, the flexible or dimensionally stable protective cover 6 is slightly smaller in top view than the flexible window pane 4. Metal pieces 24 are inserted in the edge areas of the cover 6. Magnets 26 are then placed from the direction of the interior side of the window pane 4 to interact with the metal pieces 24 and thereby hold the protective cover 6. An embodiment illustrated in FIG. 9 the protective cover 6 holds the magnets 26, with the metal pieces 24 being placed on the interior side of the window pane 4. In this embodiment, as in the other embodiments, the protective cover 6 may be dimensionally stable, as well as flexible.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A convertible top comprising:

a flexible window pane made of plastic and having an exterior side;

a protective cover for covering the flexible window pane on the exterior side of the flexible window pane; and protective cover attaching means for accommodating rapid manual movement of the protection cover between a position not covering the flexible window pane and a position covering the flexible window pane to accommodate passage of the convertible top through an automatic car wash without damage to the flexible window pane.

2. A convertible top according to claim 1, wherein the protective cover is made of a lye-resistant plastic material.

3. A convertible top according to claim 1, wherein the protective cover is constructed in one piece.

4. A convertible top according to claim 1, wherein the protective cover has several portions, the portions being connected with one another in a foldable manner.

5. A convertible top according to claim 1, wherein the protective cover is a dimensionally stable, drawn plastic part, and has an offset edge area which is fastenable on the convertible top by way of the protective cover attaching means.

6. A convertible top according to claim 5, wherein the protective cover has an interior section adjacent to the edge area, the interior section extending at a distance with respect to the flexible window pane.

7. A convertible top according to claim 1, wherein said protective cover attaching means includes locally arranged fast-closing devices that detachably connect the protective cover with the top.

8. A convertible top according to claim 1, wherein said protective cover attaching means includes locally projecting hooks mounted on a circumference of the protective cover; and receiving devices connected with the convertible top, the hooks being adapted for insertion into the receiving devices.

9. A convertible top according to claim 1, wherein said protective cover attaching means includes a clamping fastener for clamping the protective cover to the top.

10. A convertible top according to claim 9, wherein the top includes a U-shaped receiving section which projects over the flexible window pane and includes a leg, and the protective cover has an offset edge area that reaches under the leg to form the clamping fastener.

11. A convertible top according to claim 1, wherein said protective cover attaching means includes a magnetic fastening that fastens the protective cover to the flexible window pane.

12. A convertible top according to claim 11, wherein the magnetic fastening includes at least one metal piece attached to the protective cover, and a magnet that interacts with the metal piece to fasten the protective cover to the flexible window pane.

13. A convertible top according to claim 12, wherein the magnet is on the interior of the flexible window pane and the metal piece is on the exterior of the flexible window pane when the protective cover is in a fastened position.

14. A convertible top according to claim 11, wherein the magnetic fastening includes at least one magnet attached to the protective cover, and a metal piece that interacts with the magnet to fasten the protective cover to the flexible window pane.

15. A convertible top according to claim 14, wherein the metal piece is on the interior of the flexible window pane and the magnet is on the exterior of the flexible window pane when the protective cover is in a fastened position.

16. A method of washing a convertible automobile with a flexible plastic window pane using an automatic car washing machine, comprising the sequential steps of:

placing a protective cover over the flexible plastic window pane, proceeding through an automatic car washing machine with the convertible automobile, said protective cover preventing brushes from the machine scratching the flexible plastic window pane, and removing the protective cover from the flexible plastic window pane after the convertible automobile is through the car washing machine.

17. A method according to claim 16, further comprising washing the flexible plastic window pane before placing the protective cover thereover.

* * * * *